G. S. CRANSON,

Assignor, by mesne assignments, to R. L. DOWNTON.

BUCKWHEAT HULLING APPARATUS.

No. 10,091. Reissued Apr. 25, 1882.

Chas. J. Buchheit
Edw. J. Brady
Witnesses.

G. S. Cranson, Inventor.
By Wilhelm & Bonner.
Attorneys.

N. PETERS, Photo-Lithographer, Washington, D. C.

UNITED STATES PATENT OFFICE.

GILES S. CRANSON, OF SILVER CREEK, NEW YORK, ASSIGNOR, BY MESNE ASSIGNMENTS, TO ROBERT L. DOWNTON, OF ST. LOUIS, MISSOURI.

BUCKWHEAT-HULLING APPARATUS.

SPECIFICATION forming part of Reissued Letters Patent No. 10,091, dated April 25, 1882.

Original No. 217,513, dated July 15, 1879. Application for reissue filed August 24, 1881.

*To all whom it may concern:*

Be it known that I, GILES S. CRANSON, of Silver Creek, in the county of Chautauqua, in the State of New York, formerly of Syracuse, in the State of New York, have invented new and useful Improvements in Machinery for Hulling or Shucking Buckwheat, of which the following, taken in connection with the accompanying drawings, is a full, clear, and exact description.

The purpose of this invention is to expeditiously and effectually remove from the grains their hulls or external shells or coverings with the least possible loss of the meats or kernels preparatory to converting the same into flour.

The invention consists in the peculiar construction and combination of a pair of rollers, whereby the grains are hulled, as hereinafter fully set forth.

Figure 1:
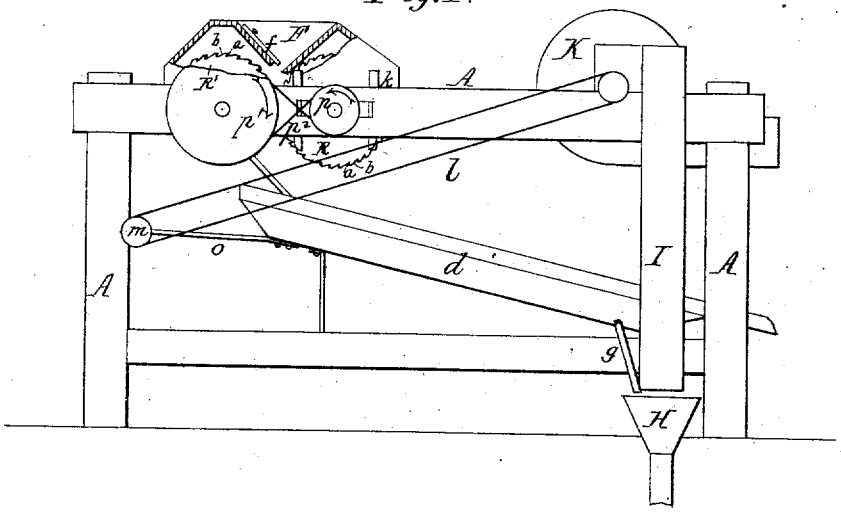
Figure 2:
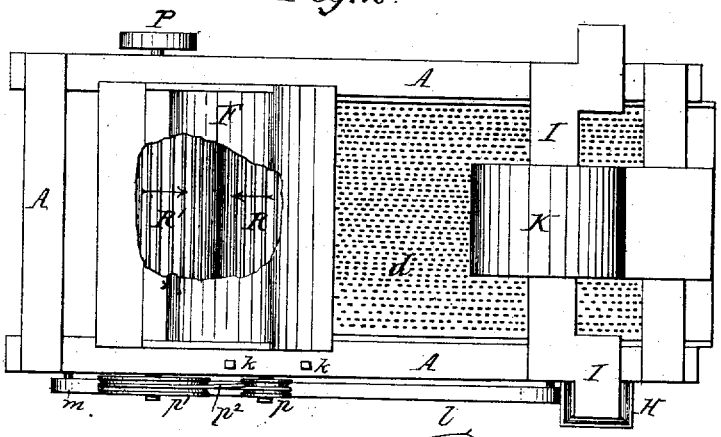
Figure 3:
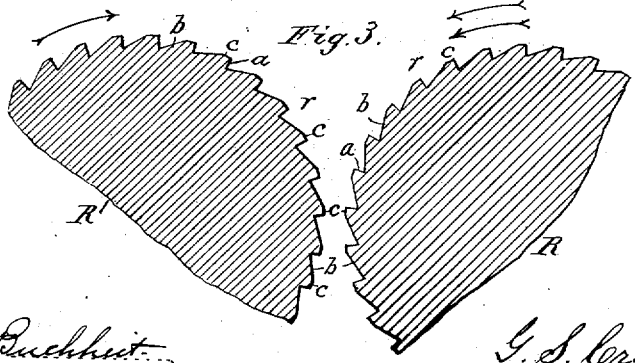

In the accompanying drawings, Figure 1 is a side elevation, partly in section, of my improved machine. Fig. 2 is a top plan view of the same. Fig. 3 is an enlarged fragmentary cross-section of the rollers.

Like letters of reference refer to like parts in the several figures.

R R′ represent two cylinders or rollers arranged horizontally in a stationary frame, A, and journaled in suitable bearings on said frame. The rollers R R′ are provided on their peripheries with longitudinal ribs *r*, each having an abrupt side, *a*, and an inclined or beveled side, *b*. The rollers R R′ revolve in opposite directions with their upper halves toward each other and with different peripheral velocities, the roller R turning faster than the roller R′. The ribs on the fast roller R have their inclined or beveled sides *b* arranged to form the front or advancing sides of the ribs, while the abrupt sides *a* form the backs of the ribs, and the ribs on the slow roller R′ are arranged in an inversed order—that is, so that their abrupt sides *a* form the fronts or advancing sides of the ribs and the inclined sides *b* the backs thereof. By this peculiar arrangement of the ribs the inclined or beveled fronts of the ribs on the fast roller R operate by reason of their greater speed against the inclined backs of the ribs on the slow roller R′, whereby the grain is compressed between the two inclined sides of a pair of ribs, and the hull or cuticle of the grain is taken off without cutting or pulverizing the same. The grooves between the ribs *r* are arranged slightly apart on the periphery of the roller, so that a plain face, *c*, is formed on the surface of the roller between the abrupt and beveled sides of each rib, whereby the edge of each rib is made blunt, somewhat like the feather or trailing edge used in millstone-dresses.

The two rollers R R′ are arranged at a greater or less distance from each other, according to the size of the grain operated upon, the rollers being made adjustable toward each other by securing the journal-boxes of one or both cylinders between set-screws or wedge-keys *k*, as illustrated in Fig. 1.

Numerous and various experiments have developed the fact that the peculiar shape of the grain of buckwheat and the fragility of its hull or shuck debar the use of a concave opposing surface in connection with the convex surface of a horizontal revolving grooved or serrated cylinder, inasmuch as such arrangement does not impart to the grain the requisite rolling motion in the feed of the machine, and forms a wedging feed, which subjects the shucks to excessive abrasion and crushing. Hence such devices are not contemplated in this invention.

By my invention, already fully described, the grain is caused to roll to the feed of the machine and subjected to only one quick pinch, with a slight abrasion, and is then immediately released, which is the only action that will successfully accomplish the object sought in this invention.

F represents the feed-hopper from which the grain is delivered between the rollers R R′, the feed being regulated by a slide, *f*.

*p p′* represent a large and small pulley secured respectively to the shafts of the rollers R R′; and $p^2$ is a crossed belt whereby the two pulleys are connected so as to rotate the two rollers R R′ in the proper direction at the desired different peripheral speeds. Motion is imparted to the shaft of the roller R′ by a pulley, P.

*d* represents a vibrating screen located beneath the rollers R R′, and receiving the hulled grain discharged therefrom. This screen discharges the coarse shucks over its end, and allows the meats to pass through its meshes onto a finer screen arranged below the screen *d*. The finer portions of meats pass through the meshes of the lower screen, and are conducted by a separate spout, *g*, to a receiver, H, while the coarser portions of the meats are discharged into air-trunks I, arranged on both sides of the machine, and connected at their upper ends with the eyes of a suction-fan, K. The air-currents which pass upward through the air-trunks I remove the light impurities from the meats, leaving the flour-yielding portion in a pure and granulated state. These portions of the meats are discharged from the air-trunks I into the receivers H. The fan is driven by an endless belt, *l*, from the shaft *m*, which vibrates the screens by means of a connecting-rod, *o*. The hulls or shucks, being removed from the flour-producing parts of the grain in large fragments or flakes, as aforesaid, are readily separated by the screens from the flour-producing parts.

I claim as my invention—

1. The combination, with a roller, R, provided with ribs having inclined or beveled front sides *b* and abrupt backs *a*, of a roller, R′, provided with ribs having abrupt front sides *a* and inclined or beveled backs *b*, substantially as set forth.

2. The combination, with a roller, R, provided with ribs having inclined or beveled front sides *b* and abrupt backs *a*, of a roller, R′, provided with ribs having abrupt front sides *a* and inclined or beveled backs *b*, and suitable mechanism whereby a greater peripheral speed is imparted to the roller R than to the roller R′, substantially as set forth.

3. A pair of rollers, R R′, provided with ribs *r*, having abrupt sides *a* and inclined or beveled sides *b*, with plain faces *c*, formed by portions of the roller-surface between the abrupt and inclined sides of the ribs, substantially as set forth.

4. A pair of rollers, R R′, revolving at different peripheral speeds, and provided with ribs *r*, having inclined or beveled front sides *b* and abrupt backs *a* on the fast roller, and abrupt front sides *a* and inclined backs *b* on the slow roller, with plain faces *c* on the surfaces of the rollers between the inclined and abrupt sides of each rib, and suitable mechanism whereby said differential speed is imparted to the rollers, substantially as set forth.

GILES S. CRANSON.

Witnesses:
JNO. J. BONNER,
EDW. J. BRADY.